United States Patent
Kim et al.

(10) Patent No.: US 10,491,315 B2
(45) Date of Patent: Nov. 26, 2019

(54) COMMUNICATION METHOD FOR LOW LATENCY SERVICES IN XHAUL NETWORK

(71) Applicant: Electronics and Telecommunications Research Institute, Daejeon (KR)

(72) Inventors: Jun Woo Kim, Daejeon (KR); Jun Hwa Lee, Daejeon (KR); Duk Hyun You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 38 days.

(21) Appl. No.: 15/864,346

(22) Filed: Jan. 8, 2018

(65) Prior Publication Data

US 2018/0198539 A1 Jul. 12, 2018

(30) Foreign Application Priority Data

Jan. 10, 2017 (KR) ........................ 10-2017-0003275

(51) Int. Cl.
*H04W 72/04* (2009.01)
*H04B 17/309* (2015.01)
(Continued)

(52) U.S. Cl.
CPC ....... *H04B 17/309* (2015.01); *H04B 7/15528* (2013.01); *H04B 17/318* (2015.01);
(Continued)

(58) Field of Classification Search
CPC .............. H04B 17/309; H04B 7/15528; H04B 17/318; H04B 17/336; H04W 72/04;
(Continued)

(56) References Cited

U.S. PATENT DOCUMENTS 8,259,637 B2 9/2012 Bertrand et al.
8,619,606 B2 12/2013 Nagaraja
(Continued)

OTHER PUBLICATIONS

Antonio De La Oliva et al., "Xhaul: Toward An Integrated Fronthaul/Backhaul Architecture in 5G Networks", IEEE Wireless Communications, pp. 32-40, Oct. 2015.
(Continued)

*Primary Examiner* — Jay P Patel
(74) *Attorney, Agent, or Firm* — Rabin & Berdo, P.C.

(57) ABSTRACT

An operation method of a relay base station in a communication network including a central base station, the relay base station, and a terminal may comprise receiving a request message for requesting a low latency service from the terminal; in response to the request message, measuring a signal quality of a radio link between the central base station and the relay station and a signal quality of a radio link between the relay base station and the terminal; determining whether to support the low latency service based on the signal qualities; and when the low latency service is determined to be supported, transmitting downlink data received from the central base station to the terminal without performing modulation and demodulation operations, or transmitting uplink data received from the terminal to the central base station without performing modulation and demodulation operations.

16 Claims, 9 Drawing Sheets

(51) Int. Cl.
  *H04W 24/08* (2009.01)
  *H04W 40/22* (2009.01)
  *H04L 1/18* (2006.01)
  *H04B 17/318* (2015.01)
  *H04B 17/336* (2015.01)
  *H04B 7/155* (2006.01)
  *H04W 84/04* (2009.01)
  *H04L 1/00* (2006.01)

(52) U.S. Cl.
  CPC ......... *H04B 17/336* (2015.01); *H04L 1/1861* (2013.01); *H04W 24/08* (2013.01); *H04W 40/22* (2013.01); *H04W 72/04* (2013.01); *H04L 1/1887* (2013.01); *H04L 2001/0097* (2013.01); *H04W 84/047* (2013.01)

(58) Field of Classification Search
  CPC ... H04W 40/22; H04W 24/08; H04W 84/047; H04L 1/1861
  See application file for complete search history.

(56) References Cited

U.S. PATENT DOCUMENTS

| | | | |
|---|---|---|---|
| 8,811,257 | B2 | 8/2014 | Aminaka et al. |
| 9,065,527 | B2 * | 6/2015 | Hoshino ............... H04B 7/155 |
| 9,154,352 | B2 | 10/2015 | Palanki et al. |
| 2002/0075869 | A1 * | 6/2002 | Shah ................. H04Q 11/0071 370/389 |
| 2009/0010198 | A1 | 1/2009 | Boariu et al. |
| 2009/0252080 | A1 | 10/2009 | Kim et al. |
| 2010/0035541 | A1 | 2/2010 | Kim et al. |
| 2012/0182926 | A1 | 7/2012 | Yu et al. |
| 2013/0095747 | A1 * | 4/2013 | Moshfeghi ............ H04W 88/06 455/7 |
| 2013/0163507 | A1 * | 6/2013 | Hoshino ................ H04B 7/155 370/315 |
| 2014/0133335 | A1 * | 5/2014 | Morioka ............... H04W 40/08 370/252 |
| 2015/0092676 | A1 * | 4/2015 | Periyalwar ........... H04W 4/029 370/329 |
| 2015/0341107 | A1 | 11/2015 | Hong et al. |
| 2016/0037550 | A1 * | 2/2016 | Barabell ............. H04B 17/318 455/450 |
| 2017/0033906 | A1 * | 2/2017 | Siomina ................ H04L 5/0048 |
| 2017/0064706 | A1 * | 3/2017 | Patel ................ H04W 72/0446 |
| 2017/0359766 | A1 * | 12/2017 | Agiwal ................ H04W 76/14 |
| 2018/0092017 | A1 * | 3/2018 | Freda ................... H04W 76/14 |
| 2018/0139682 | A1 * | 5/2018 | Xu ....................... H04W 88/04 |
| 2018/0144214 | A1 | 5/2018 | Hsieh ................... G06K 9/6265 |
| 2018/0160287 | A1 * | 6/2018 | Wu ........................ H04W 4/06 |
| 2018/0167915 | A1 * | 6/2018 | Lee ....................... H04W 76/10 |
| 2018/0213530 | A1 * | 7/2018 | Mochizuki ........... H04W 72/12 |
| 2018/0234919 | A1 * | 8/2018 | Tsuda ................... H04W 8/005 |
| 2018/0255505 | A1 * | 9/2018 | Thyagarajan ........ H04W 8/005 |
| 2019/0053215 | A1 * | 2/2019 | Yu .................... H04B 7/15542 |

OTHER PUBLICATIONS

Meryem Simsek et al., "5G-Enabled Tactile Internet", IEEE Journal on Selected Areas in Communications, vol. 34, No. 3, pp. 460-473, Mar. 2016.

* cited by examiner

COMMUNICATION METHOD FOR LOW LATENCY SERVICES IN XHAUL NETWORK

CROSS-REFERENCE TO RELATED APPLICATIONS

This application claims priorities to Korean Patent Applications No. 10-2017-0003275 filed on Jan. 10, 2017 in the Korean Intellectual Property Office (KIPO), the entire contents of which are hereby incorporated by reference.

BACKGROUND

1. Technical Field

The present disclosure relates to a communication technology for low latency services, and more specifically, to a communication technology for low latency services in an xhaul network comprising a central base station, a relay base station, a terminal, and the like.

2. Related Art

A communication system may comprise a core network (e.g., a serving gateway (S-GW), a packet data network (PDN) gateway (P-GW), a mobility management entity (MME), etc.), a base station (e.g. a macro base station, a small base station, a relay, etc.), a terminal, and the like. Communications between the base station and the terminal may be performed using various radio access technologies (RATs) such as 4G communication technology, 5G communication technology, wireless broadband technology (WiBro), wireless local area network (WLAN), wireless personal area network (WPAN) technology, etc.

The base station may be connected to the core network via a wired backhaul or a wireless backhaul. For example, the base station may transmit data, control information, and the like, which are received from the terminal, to the core network through the wired backhaul or wireless backhaul. The base station may also receive data, control information, and the like from the core network via the wired backhaul or wireless backhaul.

Meanwhile, the communication system may include a central base station, at least one relay base station connected to the central base station, and the like. Alternatively, the communication system may include a base band unit (BBU), at least one remote radio head (RRH) connected to the BBU, and the like. In this case, the central base station (or BBU) may be connected to the core network via a wired link (e.g., a wired backhaul) or a wireless link (e.g., wireless backhaul), and the relay base station (or RRH) may be connected to the central base station (or BBU) via a wireless link (e.g., a wireless fronthaul). Here, the wired and wireless backhaul and the wireless fronthaul may be referred to as 'xhaul', and the communication network including the xhaul may be referred to as an 'xhaul network'.

Radio paths of the xhaul network may support millimeter wave (mmWave) bands (e.g., 30 GHz to 300 GHz). In this case, a communication scheme (e.g., RAT, modulation and coding scheme (MCS), etc.) supported by the xhaul network may differ from a communication scheme supported by a radio link between the relay base station (or RRH) and the terminal. Therefore, the relay base station (or RRH) is required to perform additional operations (e.g., demodulation, decoding, scheduling, coding, and modulation operations) in order to support communications between the central base station (or BBU) and the terminal, and thus a transmission latency due to the additional operations may occur.

SUMMARY

Accordingly, embodiments of the present disclosure provide a communication method for reducing a transmission latency in an xhaul network.

In order to achieve the objective of the present disclosure, an operation method of a relay base station in a communication network including a central base station, the relay base station, and a terminal may comprise receiving a request message for requesting a low latency service from the terminal; in response to the request message, measuring a signal quality of a radio link between the central base station and the relay station and a signal quality of a radio link between the relay base station and the terminal; determining whether to support the low latency service based on the signal qualities; and when the low latency service is determined to be supported, transmitting downlink data received from the central base station to the terminal without performing modulation and demodulation operations on the downlink data, or transmitting uplink data received from the terminal to the central base station without performing modulation and demodulation operations on the uplink data.

When the low latency service is determined to be supported, a communication scheme used for the radio link between the central base station and the relay base station may be configured to be identical to a communication scheme used for the radio link between the relay base station and the terminal.

A resource used for the low latency service may be configured when the low latency service is determined to be supported, or configured statically in advance.

The method may further comprise performing error checking of the downlink data or the uplink data; and when there is an error in the uplink data or the downlink data, transmitting a negative acknowledgement (NACK) message to the central base station and the terminal.

The method may further comprise, when the low latency service is determined to be supported, transmitting, to the central base station and the terminal, a response message including information on a common communication scheme commonly used for the radio link between the central base station and the relay base station and the radio link between the relay base station and the terminal.

The radio link between the central base station and the relay base station may support a millimeter wave band, and the radio link between the relay base station and the terminal may support a frequency band other than the millimeter wave band.

The method may further comprise, when the low latency service is determined not to be supported, transmitting a response message indicating that support of the low latency service is impossible to the central base station and the terminal.

The method may further comprise, when the low latency service is determined not to be supported, transmitting the downlink data to the terminal after performing modulation and demodulation operations on the downlink data, or transmitting the uplink data to the central base station after performing modulation and demodulation operations on the uplink data.

In order to achieve the objective of the present disclosure, an operation method of a terminal in a communication network including a central base station, a relay base station, and the terminal may comprise transmitting a request message for requesting a low latency service to the relay base station; when the low latency service is determined to be supported, receiving, from the relay base station, a response message including information on a common communication scheme commonly used for both of a radio link between the central base station and the relay base station and a radio link between the relay station and the terminal; and receiving downlink data from the relay base station based on the common communication scheme or transmitting uplink data to the relay base station based on the common communication scheme.

The response message may be received when both of a signal quality of the radio link between the central base station and the relay base station and a signal quality of the radio link between the relay base station and the terminal are equal to or greater than a preset threshold.

When the low latency service is determined to be supported, a communication scheme used for the radio link between the central base station and the relay base station may be configured to be identical to a communication scheme used for the radio link between the relay base station and the terminal.

The radio link between the central base station and the relay base station may support a millimeter wave band, and the radio link between the relay base station and the terminal may support a frequency band other than the millimeter wave band.

In order to achieve the objective of the present disclosure, a relay base station in a communication network including a central base station, the relay base station, and a terminal may comprise a processor and a memory storing at least one instruction executed by the processor. Also, the at least one instruction may be configured to receive a request message for requesting a low latency service from the terminal; in response to the request message, measure a signal quality of a radio link between the central base station and the relay station and a signal quality of a radio link between the relay base station and the terminal; determine whether to support the low latency service based on the signal qualities; and when the low latency service is determined to be supported, transmit downlink data received from the central base station to the terminal without performing modulation and demodulation operations on the downlink data, or transmit uplink data received from the terminal to the central base station without performing modulation and demodulation operations on the uplink data.

When the low latency service is determined to be supported, a communication scheme used for the radio link between the central base station and the relay base station may be configured to be identical to a communication scheme used for the radio link between the relay base station and the terminal.

A resource used for the low latency service may be configured when the low latency service is determined to be supported, or configured statically in advance.

The at least one instruction may be further configured to perform error checking of the downlink data or the uplink data; and transmit a negative acknowledgement (NACK) message to the central base station and the terminal when there is an error in the uplink data or the downlink data.

The at least one instruction may be further configured to, when the low latency service is determined to be supported, transmit, to the central base station and the terminal, a response message including information on a common communication scheme commonly used for the radio link between the central base station and the relay base station and the radio link between the relay base station and the terminal.

The radio link between the central base station and the relay base station may support a millimeter wave band, and the radio link between the relay base station and the terminal may support a frequency band other than the millimeter wave band.

The at least one instruction may be further configured to, when the low latency service is determined not to be supported, transmit a response message indicating that support of the low latency service is impossible to the central base station and the terminal.

The at least one instruction may be further configured to, when the low latency service is determined not to be supported, transmit the downlink data to the terminal after performing modulation and demodulation operations on the downlink data, or transmit the uplink data to the central base station after performing modulation and demodulation operations on the uplink data.

According to the embodiments of the present disclosure, when a signal quality satisfies a preset threshold in the radio link (e.g., the wireless backhaul, the wireless fronthaul, the radio link between the relay base station (or RRH) and the terminal, etc.), the low latency services (i.e., low latency communications) can be performed. In this case, the relay base station (or RRH) can transmit downlink data received from the central base station (or BBU) to the terminal without performing additional operations (e.g., demodulation, decoding, scheduling, coding, and modulation operations). Also, the relay base station (or RRH) can transmit uplink data received from the terminal to the central base station (or BBU) without performing such the additional operations (e.g., demodulation, decoding, scheduling, coding, and modulation operations). Therefore, the performance of the communication network can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
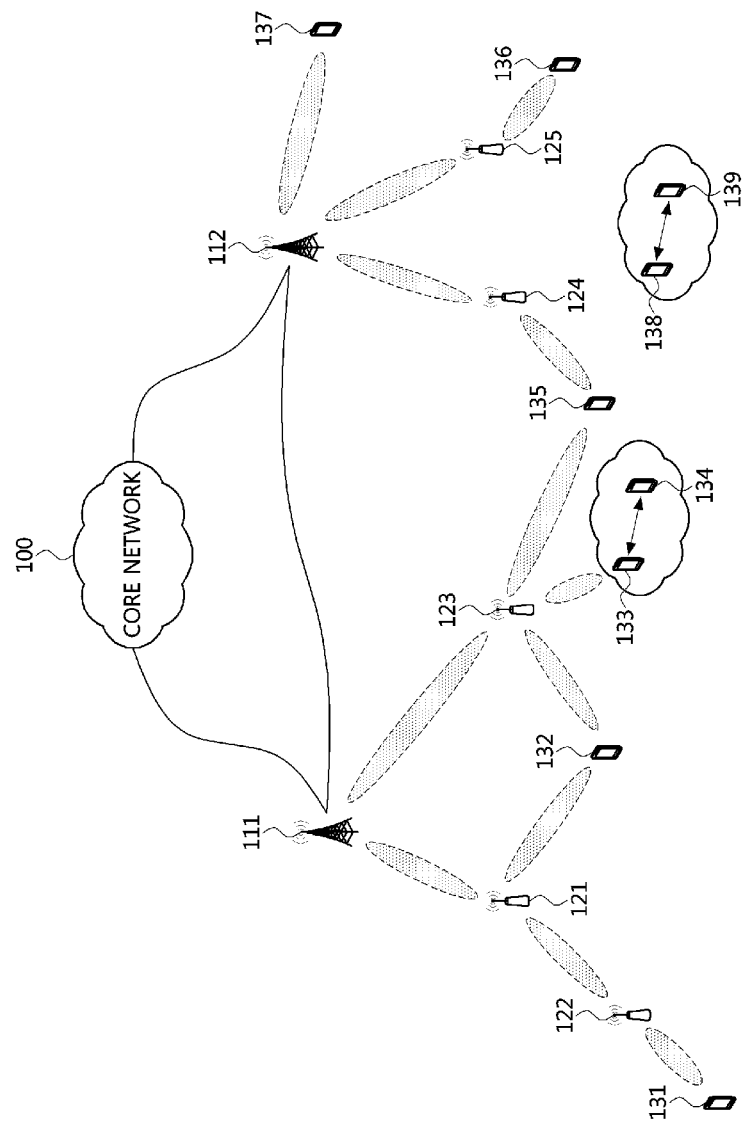
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a communication system.

Referring to FIG. 1, a communication system may comprise a core network 100, central base stations 111 and 112, relay base stations 121, 122, 123, 124 and 125, terminals 131, 132, 133, 134, 135, 136, 137, 138, and 139, and the like. The communication system (i.e., communication nodes included in the communication system) may support a variety of radio access technologies (RATs) (e.g., 4G communication technologies and 5G communication technologies such as long term evolution (LTE), LTE-advanced (LTE-A), wireless broadband (WiBro), wireless local area network (WLAN), wireless personal area network (WPAN), and the like).

Also, the communication system (i.e., communication nodes included in the communication system) may support beamforming techniques, massive multiple input multiple output (MIMO) techniques, full dimension (FD) MIMO techniques, device-to-device (D2D) communication techniques, carrier aggregation techniques, coordinated multi-point (CoMP) techniques, interference management/alignment/cancellation techniques, advanced coding modulation (ACM) techniques, frequency quadrature amplitude modulation (FQAM), sliding window superposition coding (SWSC), filter bank multi carrier (FBMC) modulation, non-orthogonal multiple access (NOMA), sparse code multiple access (SCMA), radio links (e.g., wireless backhaul, wireless fronthaul, and xhaul related technologies), and the like. Here, the radio link may support the mmWave bands (e.g., 30 GHz to 300 GHz).

The core network 100 may include a mobility management entity (MME), a serving gateway (SGW), a packet data network (PDN) gateway, and the like. Each of the central base stations 111 and 112 may be a base band unit (BBU). In this case, each of the relay base stations 121, 122, 123, 124 and 125 may be a remote radio head (RRH). Each of the central base stations 111 and 112 may be connected to the core network via a wired backhaul or a wireless backhaul (e.g., a mmWave based wireless backhaul). The first central base station 111 may be connected to the second central base station 112 via a wired interface (e.g., an X2 interface).

The first central base station 111 may be connected to the relay stations 121 and 123 through the wireless fronthaul. The first relay base station 121 may be connected to the second relay base station 122 through the wireless fronthaul, and may perform communications with the second terminal 132. Also, the second relay base station 122 may perform communications with the first terminal 131. Here, the base stations 111, 121, and 122 may be connected in a multi hop manner. Also, the third relay base station 123 may perform communications with the terminals 132, 133, and 135. The second terminal 132 may communicate with the first relay base station 121 and the third relay base station 123 based on the CoMP technique, and the fifth terminal 135 may communicate with the third relay base station 123 and the fourth relay base station 124 based on the CoMP technique.

Also, the third terminal 133 may communicate with the fourth terminal 134 based on the D2D communication technique. The D2D communications between the third terminal 133 and the fourth terminal 134 may be controlled by the third relay base station 123.

The second central base station 112 may be connected to the relay base stations 124 and 125 through the wireless fronthaul, and may communicate with the seventh terminal 137. The fourth relay base station 124 may communicate with the fifth terminal 135, and the fifth relay base station 125 may communicate with the sixth terminal 136. Meanwhile, the eighth terminal 138 may communicate with the ninth terminal 139 based on the D2D communication technique. The D2D communications between the eighth terminal 138 and the ninth terminal 139 may not be controlled by any one of the base stations 111, 112, 121, 122, 123, 124, and 125.

Figure 2:
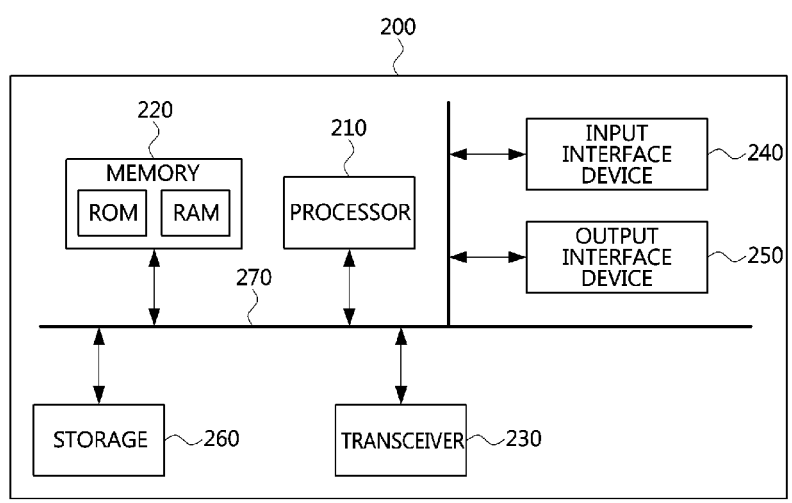
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, connection methods between the base station and the terminal will be described. Even if a method (e.g., transmission or reception of a message) to be performed at a first communication node among the communication nodes is described, the corresponding second communication node may perform a method (e.g., reception or transmission of the message) corresponding to the method performed at the first communication node. That is, when the operation of the terminal is described, the corresponding base station may perform an operation corresponding to the operation of the terminal. Conversely, when the operation of the base station is described, the corresponding terminal may perform an operation corresponding to the operation of the base station.

Figure 3:
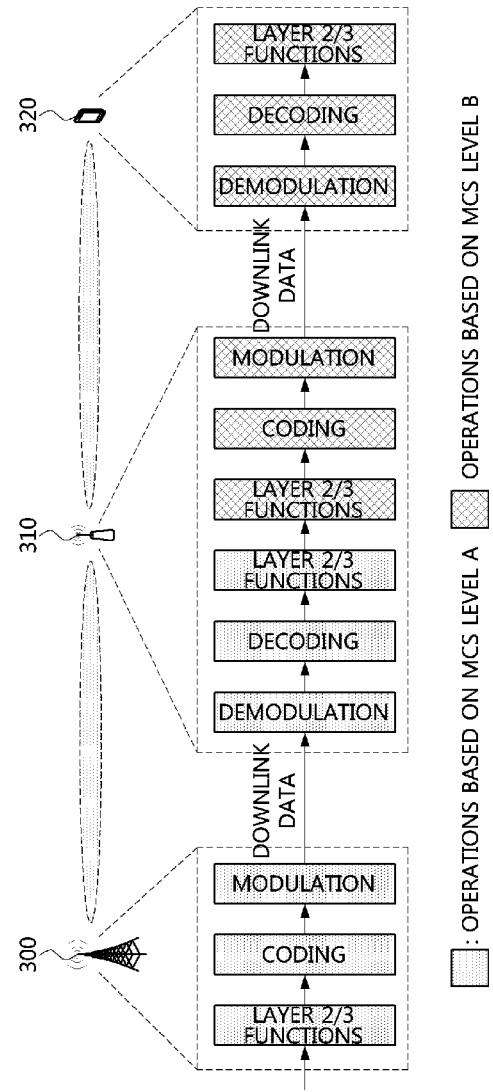
FIG. 3 is a conceptual diagram illustrating an embodiment of transmission and reception operation of downlink data performed in a communication node.

FIG. 3 is a conceptual diagram illustrating an embodiment of transmission and reception operation of downlink data performed in a communication node.

Referring to FIG. 3, a communication system may be the same as or similar to the communication system shown in FIG. 1. For example, a central base station 300 may be the same as or similar to the central base stations 111 and 112 shown in FIG. 1, a relay base station 310 may be the same as or similar to the relay base stations 121, 122, 123, 124 and 125 shown in FIG. 1, and a terminal 320 may be the same as or similar to the terminals 131, 132, 133, 134, 135, 136, 137, 138 and 139 shown in FIG. 1. Communications between the central base station 300 and the relay base station 310 may be performed through a wireless fronthaul. The wireless fronthaul may support the mmWave band. Also, communications between the relay base station 310 and the terminal 320 may be performed in a frequency band other than the mmWave band.

In the case that the communications between the central base station 300 and the relay base station 310 are performed in the mmWave band, a radio link between the central base station 300 and the relay base station 310 (hereinafter, referred to as a 'radio link A') may provide better signal quality (or, transmission capacity, reliability, quality of service (QoS), or the like) than a radio link between the relay base station 310 and the terminal 320. Therefore, a communication scheme (e.g., RAT, modulation and coding scheme (MCS) level, etc.) used in the radio link A may differ from a communication scheme (e.g., RAT, MCS level, etc.) used in the radio link B. That is, the communication scheme used in the radio link A may provide improved signal quality (or transmission capacity, reliability, QoS, or the like) over the communication scheme used in the radio link B. For example, the LTE-A technology may be used for the radio link A, and WiMax technology may be used for the radio link B. Meanwhile, when a MCS level A is used in the radio link A and a MCS level B is used in the radio link B, a transmission and reception method of downlink data may be as follows.

The central base station 300 may perform layer 2/3 functions for downlink transmission. For example, the central base station 300 may schedule the downlink transmission based on the RAT used in the radio link A. After the scheduling of the downlink transmission is completed, the central base station 300 may perform coding and modulation operations on downlink data based on the MCS level A. The central base station 300 may then transmit the coded and modulated downlink data to the relay base station 310 through the scheduled downlink resource. The downlink data may be transmitted from the central base station 300 to the relay base station 310 through the wireless fronthaul.

The relay base station 310 may receive the downlink data from the central base station 300, and perform demodulation and decoding operations on the downlink data based on the MCS level A. Also, the relay base station 310 may perform layer 2/3 functions for the downlink data based on the RATs used in the radio links A and B. For example, the relay base station 310 may schedule the downlink transmission based on the RAT used in the radio link B. After the scheduling of the downlink transmission is completed, the relay base station 310 may perform coding and modulation operations on the downlink data based on the MCS level B. The relay base station 310 may then transmit the downlink data to the terminal 320 through the scheduled downlink resource.

The terminal 320 may receive the downlink data from the relay base station 310, and perform demodulation and decoding operations on the downlink data based on the MCS level B. Also, the terminal 320 may perform layer 2/3 functions for the downlink data based on the RAT used in the radio link B.

In this manner, the relay base station 310 is required to perform additional operations (e.g., demodulation, decoding, layer 2/3 functions, coding, and modulation operations) for the downlink transmission, so that a transmission latency of the downlink data may occur due to the additional operations.

Figure 4:
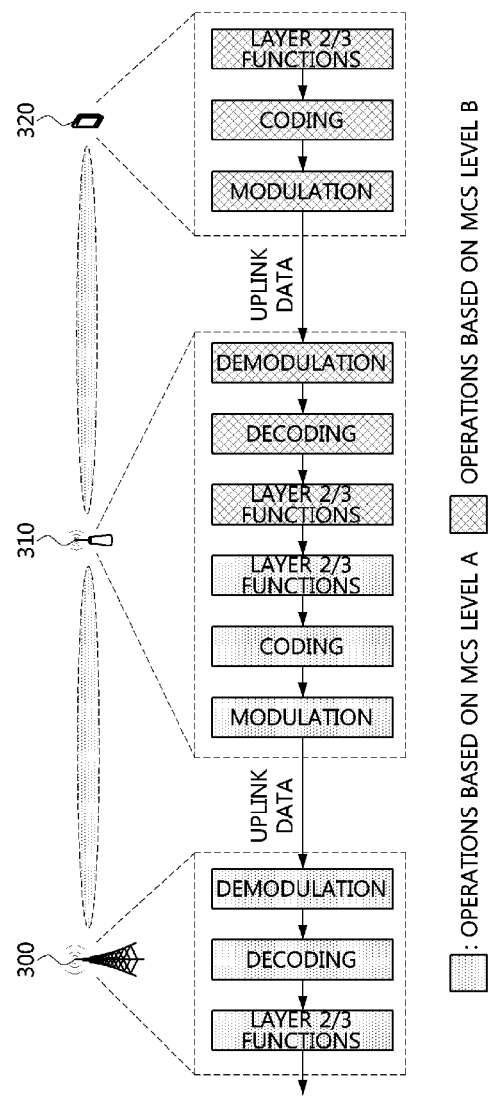
FIG. 4 is a conceptual diagram illustrating an embodiment of transmission and reception operation of uplink data performed in a communication node.

FIG. 4 is a conceptual diagram illustrating an embodiment of transmission and reception operation of uplink data performed in a communication node.

Referring to FIG. 4, a communication system may be the same as or similar to the communication system shown in FIG. 1. For example, a central base station 300 may be the same as or similar to the central base stations 111 and 112 shown in FIG. 1, a relay base station 310 may be the same as or similar to the relay base stations 121, 122, 123, 124 and 125 shown in FIG. 1, and a terminal 320 may be the same as or similar to the terminals 131, 132, 133, 134, 135, 136, 137, 138 and 139 shown in FIG. 1. Communications between the central base station 300 and the relay base station 310 may be performed through a wireless fronthaul. The wireless fronthaul may support the mmWave band. Also, communications between the relay base station 310 and the terminal 320 may be performed in a frequency band other than the mmWave band.

When a MCS level A is used in the radio link A and a MCS level B is used in the radio link B, a transmission and reception method of uplink data may be as follows.

The terminal 320 may perform layer 2/3 functions (e.g., allocation request of uplink resource) for uplink transmission. When the allocation of the uplink resource is completed, the terminal 320 may perform coding and modulation operations on uplink data based on the MCS level B. The terminal 320 may then transmit the uplink data to the relay base station 310 through the allocated uplink resource.

The relay base station 310 may receive the uplink data from the terminal 320, and may perform demodulation and decoding operations on the uplink data based on the MCS level B. Also, the relay base station 310 may perform layer 2/3 functions (e.g., an allocation request of uplink resource) for the uplink data based on the RATs used in the radio links A and B. After the allocation of the uplink resource is completed, the relay base station 310 may perform coding and modulation operations on the uplink data based on the MCS level A. The relay base station 310 may transmit the uplink data to the central base station 300 through the allocated uplink resource.

The central base station 300 may receive the uplink data from the relay base station 310 and may perform demodulation and decoding operations on the downlink data based on the MCS level A. Also, the central base station 300 may perform layer 2/3 functions for the uplink data based on the RAT used in the radio link A.

In this manner, the relay base station 310 is required to perform additional operations (e.g., demodulation, decoding, layer 2/3 function, coding, and modulation operations) for uplink transmission, so that a transmission latency of the uplink data may occur due to the additional operations.

Figure 5:
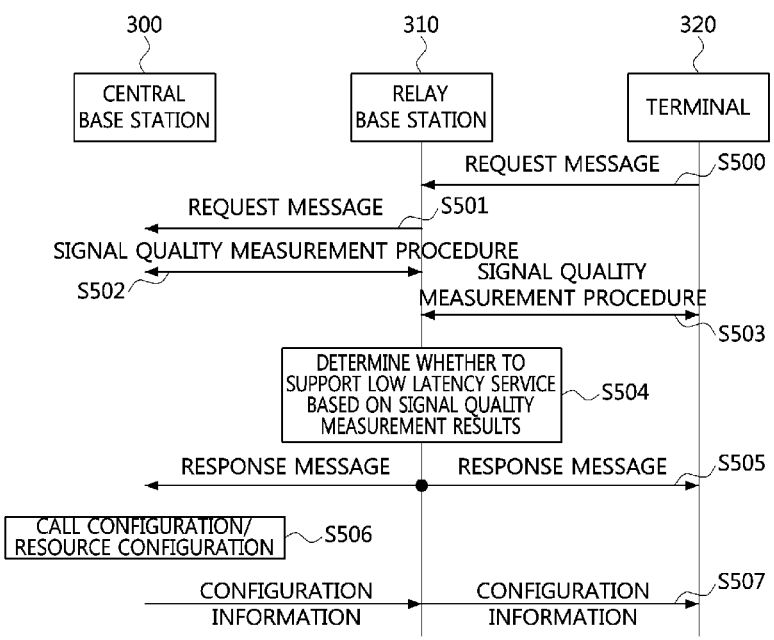
FIG. 5 is a sequence chart for explaining an embodiment of a communication method for a low latency service in a communication system.

FIG. 5 is a sequence chart for explaining an embodiment of a communication method for a low latency service in a communication system.

Referring to FIG. 5, a communication system may be the same as or similar to the communication system shown in FIG. 1. For example, a central base station 300 may be the same as or similar to the central base stations 111 and 112 shown in FIG. 1, a relay base station 310 may be the same as or similar to the relay base stations 121, 122, 123, 124 and 125 shown in FIG. 1, and a terminal 320 may be the same as or similar to the terminals 131, 132, 133, 134, 135, 136, 137, 138 and 139 shown in FIG. 1. Communications between the central base station 300 and the relay base station 310 may be performed through a wireless fronthaul. The wireless fronthaul may support the mmWave band. Also, communications between the relay base station 310 and the terminal 320 may be performed in a frequency band other than the mmWave band. Basically, a communication scheme used in the radio link A between the central base station 300 and the relay base station 310 may differ from a communication scheme in the radio link B between the relay base station 310 and the terminal 320.

If a low latency service is required, the terminal 320 may transmit a request message for requesting the low latency service to the relay base station 310 (S500). The request message may include an indicator indicating the type of the requested low latency service. For example, the low latency service may include a voice of internet protocol (VoIP) service, a video streaming service, and the like. Also, the request message may further include an indicator for requesting an uplink transmission.

The relay base station 310 may receive the request message from the terminal 320 and confirm that the low latency service is requested based on the received request message. Also, the relay station 310 may transmit a request message requesting the low latency service to the central base station 300 (S501). The request message may be transmitted from the relay base station 310 to the central base station 300 via the mmWave band. Also, the request message transmitted by the relay base station 310 may be the same as or similar to the request message transmitted by the terminal 300. The central base station 300 may receive the request message from the relay base station 310, and confirm that the low latency service is requested based on the received request message.

When the low latency service is requested, a signal quality measurement procedure for the radio link A may be performed (S502), and a signal quality measurement procedure for the radio link B may also be performed (S503). In the step S502, the central base station 300 may measure, based on a signal received from the relay base station 310, a signal to noise ratio (SNR), a signal to interference plus noise ratio (SINR), a received signal strength indication (RSSI), a reference signal received quality (RSRQ), a cross polarization isolation (XPI), and the like, and transmit a signal quality measurement result (e.g., SNR, SINR, RSSI, RSRQ, XPI, and the like) to the relay base station 310. The relay base station 310 may obtain the signal quality measurement result from the central base station 300. Alternatively, the relay base station 310 may measure the signal quality (e.g., SNR, SINR, RSSI, RSRQ, XPI, etc.) based on a signal received from the central base station 300.

In the step S503, the terminal 320 may measure SNR, SINR, RSSI, RSRQ, XPI, etc. based on a signal received from the relay base station 310, and transmit a signal quality measurement result (e.g., SNR, SINR, RSSI, RSRQ, XPI, etc.) to the relay base station 310. Alternatively, the relay base station 310 may measure the signal quality (e.g., SNR, SINR, RSSI, RSRQ, XPI, etc.) based on a signal received from the terminal 320.

The relay base station 310 may determine whether to support the requested low latency service based on the signal quality measurement results of the radio links A and B (S504). For example, if both of the signal quality measurement results of the radio links A and B are equal to or greater than a preset threshold, the relay base station 310 may determine that support of the requested low latency service is possible. That is, in the case that the signal qualities of the radio links A and B are equal to or greater than the preset threshold, it may be determined that communications between the central base station 300 and the terminal 320 are possible through simple relay of data without additional operations (e.g., demodulation, decoding, layer 2/3 functions, coding, and modulation operations) of the relay base station 310. In this case, the relay base station 310 may determine that support of the requested low latency service is possible.

On the other hand, if at least one of the signal quality measurement results of the radio links A and B is less than the preset threshold, the relay base station 310 may determine that the support of the requested low latency service is impossible. That is, it may be determined that communications between the central base station 300 and the terminal 320 are impossible through simple relay of data without additional operations (e.g., demodulation, decoding, layer 2/3 functions, coding, and modulation operations) of the relay base station 310. In this case, the relay base station 310 may determine that support of the requested low latency service is impossible. When it is determined that support of the requested low latency service is impossible, the relay base station 310 may transmit a response message indicating that the low latency service is determined not to be supported (i.e., the support of the requested low latency service is impossible) to the central base station 300 and the terminal 320. Each of the central base station 300 and the terminal 320 may determine that support of the requested low latency service is impossible by checking the response message. In the case where support of the low latency service is impossible, the communications between the central base station 300 and the terminal 320 may be performed as described with reference to FIGS. 3 and 4.

That is, the radio link A may be operated based on a high-level MCS basically to provide enhanced signal quality (or transmission capacity, reliability, QoS). When the support of the low latency service is requested, the radio link A may be operated to guarantee the minimum transmission delay within the allowance of signal quality (or transmission capacity, reliability, QoS).

The preset threshold used for determining whether or not to support the low latency service may be variously set. For example, the preset threshold may be 15 dB. In case that the signal quality measurement result (e.g., SNR) is greater than 15 dB, a transmission rate may be greater than 150 Mbps on the corresponding radio link (e.g., a radio link with a 1 GHz bandwidth). Alternatively, the preset threshold may be 23 dB. In case that the signal quality measurement result (e.g., SNR) is greater than 23 dB, the transmission rate may be greater than 300 Mbps on the corresponding radio link (e.g., a radio link with a 1 GHz bandwidth).

On the other hand, a different preset threshold may be used depending on the type of the requested low latency service. For example, a preset threshold (e.g., 23 dB) used for determining whether or not to support the VoIP service may be greater than a preset threshold (e.g., 15 dB) used for determining whether or not to support the video streaming service. The relay base station 310 may determine whether or not to support the requested low latency service according to the type of the requested low latency service.

The above-described signal quality measurement procedure (e.g., the steps S502 to S504) may be performed periodically. When it is determined by the periodic signal quality measurement procedure that support of the low latency service is possible, the low latency service may be continuously performed. On the other hand, when it is determined that the low latency service cannot be supported by the periodic signal quality measurement procedure, a response message indicating that the low latency service cannot be supported may be transmitted.

Also, the relay base station 310 may determine whether to allocate a resource (e.g., time resource, frequency resource) for the low latency service after performing the signal quality measurement procedure (e.g., the steps S502 to step S504). Since a large amount of data may be transmitted according to the characteristics of the low latency service, the relay base station 310 may determine whether there is a resource to be used for transmission of the corresponding data. If there is a resource to be used for transmission of the corresponding data, the low latency service may be performed using the resource. On the other hand, if there is no resource to be used for transmission of the corresponding data, it may be determined that the support of the low latency service is impossible.

When it is determined that the support of the low latency service is possible, the relay base station 310 may determine a communication scheme (e.g., RAT, MCS level, etc.) commonly used in the radio links A and B. The communication scheme commonly used in the radio links A and B may be referred to as a 'common communication scheme'. For example, the relay base station 310 may determine the MCS level B as the common communication scheme. The relay base station 310 may generate a response message including at least one of the common communication scheme, an indicator indicating that the requested low latency service can be supported, and the types of low latency services that can be supported, and transmit the generated response message to the central base station 300 and the terminal 320 (S505).

Each of the central base station 300 and the terminal 320 may receive the response message from the relay base station 310, and identify the information included in the response message. For example, each of the central base station 300 and the terminal 320 may identify that the low latency service can be supported, and identify the common communication scheme. Also, each of the central base station 300 and the terminal 320 may identify the types of low latency services that can be supported.

The central base station 300 may perform a call configuration operation and a resource configuration operation (S506). For example, the central base station 300 may configure downlink resources on the radio links A and B. When uplink transmission is requested, the central base station 300 may configure uplink resources in the radio links A and B. The central base station 300 may transmit the information configured in the step S506 to the relay base station 310 and the terminal 320 (S507). The relay base station 310 may support terminals using the low latency service. Among terminals served by the relay base station 310, terminals not using the low latency service may be switched to another relay base station.

Meanwhile, the resources used for the low latency service may be predetermined in advance. For example, subframes (or slots, time resources, frequency resources, etc.) used for the low latency service may be preconfigured in the central base station 300, the relay base station 310, and the terminal 320, and if it is determined that the support of the low latency service is possible, the low latency service may be performed using the predetermined resources without performing the separate resource configuration operation (e.g., the step S506 and step S507). When the low latency service is performed, the predetermined resources may be continuously maintained. For example, even if there is no downlink data (or uplink data) to be transmitted, the predetermined resources may be maintained for the low latency service.

When the configuration of the low latency service is completed as described above, methods for downlink data transmission and reception may be as follows.

Figure 6:
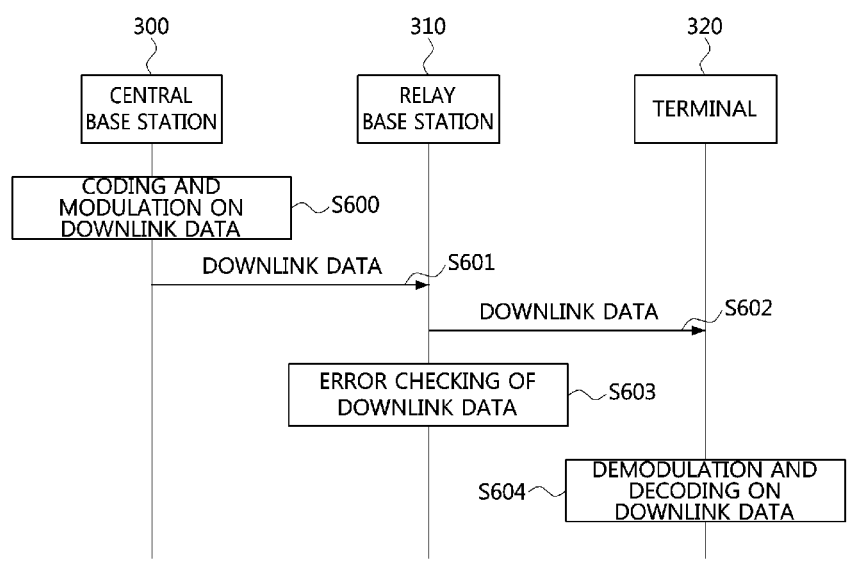
FIG. 6 is a sequence chart for explaining a downlink data transmission and reception method for a low latency service.
Figure 7:
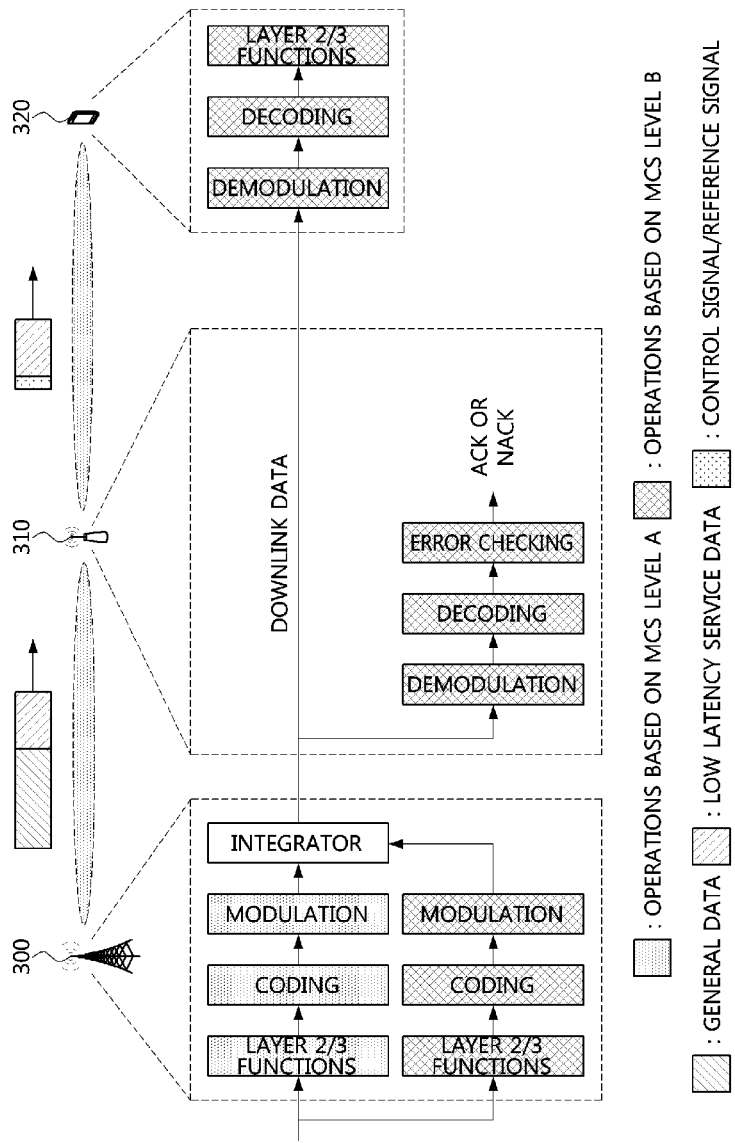
FIG. 7 is a conceptual diagram illustrating another embodiment of transmission and reception operation of downlink data performed in a communication node.

FIG. 6 is a sequence chart for explaining a downlink data transmission and reception method for a low latency service, and FIG. 7 is a conceptual diagram illustrating another embodiment of transmission and reception operation of downlink data performed in a communication node.

Referring to FIGS. 6 and 7, the central base station 300 may perform coding and modulation operations on low latency service data using the common communication scheme (e.g., MCS level B) (S600). Also, when general data (i.e., non-low latency service data) exists, the central base station 300 may perform coding and modulation operations on the general data using the MCS level A. The coded and modulated low latency service data may be merged with the coded and modulated general data in an integrator of the central base station 300. The central base station 300 may transmit downlink data (e.g., data into which the low latency service data and the general data are merged) to the relay base station 310 (S601). The downlink data may be transmitted from the central base station 300 to the relay base station 310 through the mmWave band.

The relay base station 310 may receive the downlink data from the central base station 310. Since the relay base station 310 knows the downlink resource through which the general data is transmitted, the relay base station 310 may obtain the general data from the downlink resource. The relay base station 310 may perform additional operations (e.g., demodulation, decoding, layer 2/3 function, coding, and modulation operations) on the general data, and then transmit the general data to the terminal 320. For example, the relay base station 310 may operate in the same or similar manner as the relay base station 310 shown in FIG. 3.

Also, since the relay base station 310 knows the downlink resource through which the low latency service data is transmitted, the relay base station 310 may obtain the low latency service data from the downlink resource. For example, the relay base station 310 may obtain the low latency service data through filtering. Since the low latency service is supported, the relay base station 310 may transmit the low latency service data to the terminal 320 without performing the additional operations (e.g., demodulation, decoding, layer 2/3 function, coding, and modulation operations) (S602). Here, the relay base station 310 may perform a fast Fourier transform (FFT) operation and a descrambling operation on the low latency service data, and transmit the low latency service data to the terminal 320 through an inverse FFT (IFFT). Also, when parameters of the central base station 300 are the same as parameters of the terminal 320, the low latency service data may be transmitted as copied in the time domain.

Also, the relay base station 310 may transmit a control signal and a reference signal (e.g., a pilot signal) together with the low latency service data. In this case, the low latency service data may be divided according to positions of the control signal and the reference signal in the downlink resource, and the divided low latency service data may be transmitted to the terminal 320.

The relay base station 310 may perform error checking of the low latency service data in addition to the transmission of the low latency service data (S603). For example, the relay base station 310 may perform demodulation and decoding operations on the low latency service data using the common communication scheme (e.g., MCS level B). The relay base station 310 may transmit a negative acknowledgment (NACK) message to the central base station 300 and the terminal 320 when it is determined that there is an unrecoverable error in the demodulation and decoding operations. The central base station 300 may perform a retransmission operation of the corresponding low latency service data when the NACK message is received from the relay base station 310. When the terminal 320 receives the NACK message from the relay base station 310, the terminal 320 may discard the low latency service data. When it is determined that there is no unrecoverable error in the demodulation and decoding operations, the relay base station 310 may omit transmission of an ACK message. The retransmission operation of the low latency service data may be performed quickly by the error checking procedure described above.

Meanwhile, the terminal 320 may receive the low latency service data from the relay base station 310, and perform demodulation and decoding operations on the low latency service data using the common communication scheme (e.g., MCS level B) (S604). Also, when the received low latency service data is divided, the terminal 320 may generate original low latency service data by merging the divided low latency service data. Here, it is described that the step S604 is performed after the step S603, but the order of performing the step S604 may not be limited thereto. For example, the step S604 may be performed simultaneously with step S603, or may be performed before the step S603.

If the low latency service data is successfully decoded, the terminal 320 may transmit an ACK message for the low latency service data to the relay base station 310. When the ACK message is received from the terminal 320, the relay base station 310 may determine that the low latency service data has been successfully received at the terminal 320, and transmit an ACK message for the low latency service data to the central base station 300. When the ACK message is received from the relay base station 310, the central base station 300 may determine that the low latency service data has been successfully received at the terminal 320.

If the low latency service data is not successfully decoded, the terminal 320 may transmit a NACK message for the low latency service data to the relay base station 310. When the NACK message is received from the terminal 320, the relay base station 310 may determine that the low latency service data has not been successfully received at the terminal 320, and transmit a NACK message for the low latency service data to the central base station 300. When the NACK message is received from the relay base station 310, the central base station 300 may determine that the low latency service data has not been successfully received at the terminal 320, and perform the retransmission operation for the low latency service data.

Meanwhile, when the configuration of the low latency service is completed as described above, methods for uplink data transmission and reception may be as follows.

Figure 8:
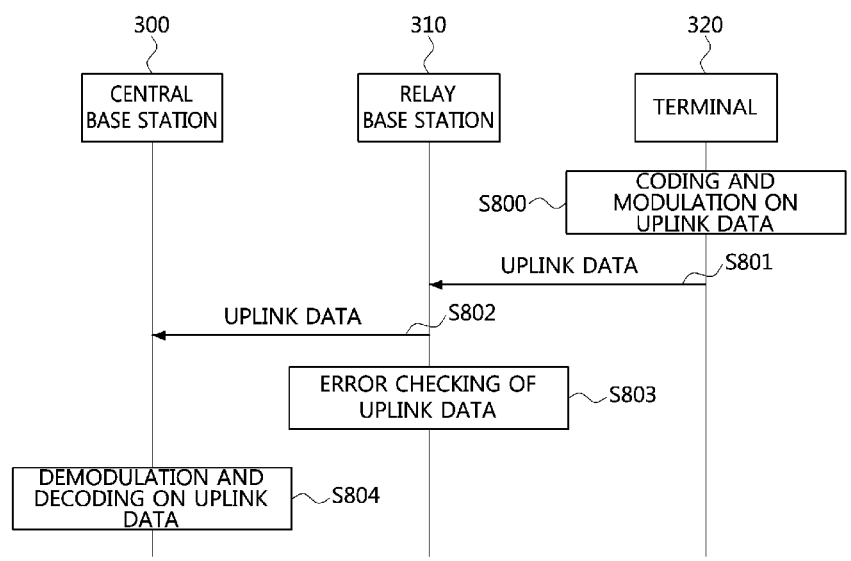
FIG. 8 is a sequence chart for explaining an uplink data transmission and reception method for a low latency service.
Figure 9:
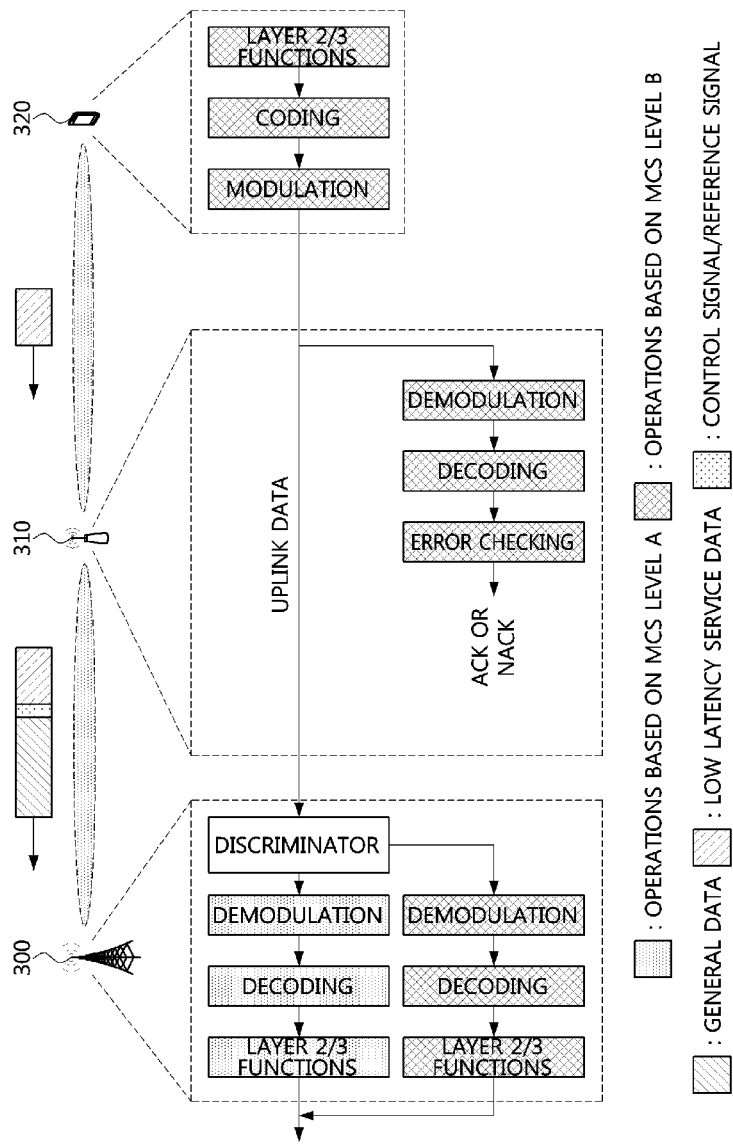
FIG. 9 is a conceptual diagram illustrating another embodiment of transmission and reception operation of uplink data performed in a communication node.

FIG. 8 is a sequence chart for explaining an uplink data transmission and reception method for a low latency service, and FIG. 9 is a conceptual diagram illustrating another embodiment of transmission and reception operation of uplink data performed in a communication node.

Referring to FIGS. 8 and 9, the terminal 320 may perform coding and modulation operations on low latency service data using the common communication scheme (e.g., MCS level B) (S800). The terminal 320 may transmit uplink data (e.g., the low latency service data) to the relay base station 310 (S801).

The relay base station 310 may receive the uplink data from the terminal 320. Since the relay base station 310 knows the uplink resource through which the low latency service data is transmitted, the relay base station 310 may obtain the low latency service data from the uplink resource. Since the low latency service is supported, the relay base station 310 may transmit the low latency service data to the central base station 300 without performing additional operations (e.g., demodulation, decoding, layer 2/3 function, coding, and modulation operations) (S802). The low latency service data may be transmitted from the relay base station 310 to the central base station 300 via the mmWave band. Here, the relay base station 310 may perform an FFT operation and a descrambling operation on the low latency service data, and transmit the low latency service data to the central base station 300 through the IFFT. Also, when parameters of the central base station 300 are the same as parameters of the terminal 320, the low latency service data may be transmitted as copied in the time domain.

Also, the relay base station 310 may transmit a control signal and a reference signal (e.g., a pilot signal) together with the low latency service data. In this case, the low latency service data may be divided according to positions of the control signal and the reference signal in the uplink resources, and the divided low latency service data may be transmitted to the central base station 300.

Meanwhile, if there is general data to be transmitted to the central base station 300, the relay base station 310 may perform additional operations (e.g., demodulation, decoding, layer 2/3 function, coding, and modulation operations), and transmit the general data to the central base station 300 together with the low latency service data. Here, the operation of the relay base station 310 may be the same as or similar to the operation of the relay base station 310 shown in FIG. 4.

The relay base station 310 may perform error checking of the low latency service data in addition to the transmission of the low latency service data (S803). For example, the relay base station 310 may perform demodulation and decoding operations on the low latency service data using the common communication scheme (e.g., MCS level B). The relay base station 310 may transmit a NACK message to the central base station 300 and the terminal 320 when it is determined that there is an unrecoverable error in the demodulation and decoding operations. The terminal 320 may perform a retransmission operation of the corresponding low latency service data when the NACK message is received from the relay base station 310. When the central base station 300 receives the NACK message from the relay base station 310, the central base station 300 may discard the low latency service data. When it is determined that there is no unrecoverable error in the demodulation and decoding operations, the relay base station 310 may omit transmission of an ACK message. The retransmission operation of the low latency service data may be performed quickly by the error checking procedure described above.

Meanwhile, the central base station 300 may receive uplink data (e.g., general data, low latency service data) from the relay base station 310. Since the central base station 300 knows uplink resource through which the general data is transmitted, the central base station 300 may obtain the general data from the uplink resource. Also, since the central base station 300 knows uplink resource through which the low latency service data is transmitted, the central base station 300 may obtain the low latency service data through the uplink resource. The general data may be separated from the low latency service data by a discriminator of the central base station 300.

The central base station 300 may perform demodulation and decoding operations on the general data using the MCS level A. Also, the central base station 300 may perform demodulation and decoding operations on the low latency service data using the common communication scheme (e.g., MCS level B) (S804). When the received low latency service data is divided, the central base station 300 may generate original low latency service data by merging the divided low latency service data. Here, it is described that the step S804 is performed after the step S803, but the order of performing the step S804 may not be limited thereto. For example, the step S804 may be performed simultaneously with step S803, or may be performed before the step S803.

If the low latency service data is successfully decoded, the central base station 300 may transmit an ACK message for the low latency service data to the relay base station 310. When the ACK message is received from the central base station 300, the relay base station 310 may determine that the low latency service data has been successfully received at the central base station 300, and transmit an ACK message for the low latency service data to the terminal 320. When the ACK message is received from the relay base station 310, the terminal 320 may determine that the low latency service data has been successfully received at the central base station 300.

If the low latency service data is not successfully decoded, the central base station 300 may transmit a NACK message for the low latency service data to the relay base station 310. When the NACK message is received from the central base station 300, the relay base station 310 may determine that the low latency service data has not been successfully received at central base station 300, and transmit a NACK message for the low latency service data to the terminal 320. When the NACK message is received from the relay base station 310, the terminal 320 may determine that the low latency service data has not been successfully received at the central base station 300, and perform the retransmission operation for the low latency service data.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a relay base station in a communication network including a central base station, the relay base station, and a terminal, the operation method comprising:
   receiving a request message for requesting a low latency service from the terminal;
   in response to the request message, measuring a signal quality of a radio link between the central base station and the relay station and a signal quality of a radio link between the relay base station and the terminal;

determining whether to support the low latency service based on the signal qualities;

when the low latency service is determined to be supported, transmitting downlink data received from the central base station to the terminal without performing modulation and demodulation operations on the downlink data, or transmitting uplink data received from the terminal to the central base station without performing modulation and demodulation operations on the uplink data; and performing error checking of the downlink data or the uplink data; and when there is an error in the uplink data or the downlink data, transmitting a negative acknowledgement (NACK) message to the central base station and the terminal.

2. The operation method according to claim 1, wherein, when the low latency service is determined to be supported, a communication scheme used for the radio link between the central base station and the relay base station is configured to be identical to a communication scheme used for the radio link between the relay base station and the terminal.

3. The operation method according to claim 1, wherein a resource used for the low latency service is configured when the low latency service is determined to be supported, or configured statically in advance.

4. The operation method according to claim 1, further comprising, when the low latency service is determined to be supported, transmitting, to the central base station and the terminal, a response message including information on a common communication scheme commonly used for the radio link between the central base station and the relay base station and the radio link between the relay base station and the terminal.

5. The operation method according to claim 1, wherein the radio link between the central base station and the relay base station supports a millimeter wave band, and the radio link between the relay base station and the terminal supports a frequency band other than the millimeter wave band.

6. The operation method according to claim 1, further comprising, when the low latency service is determined not to be supported, transmitting a response message indicating that support of the low latency service is impossible to the central base station and the terminal.

7. The operation method according to claim 1, further comprising, when the low latency service is determined not to be supported, transmitting the downlink data to the terminal after performing modulation and demodulation operations on the downlink data, or transmitting the uplink data to the central base station after performing modulation and demodulation operations on the uplink data.

8. An operation method of a terminal in a communication network including a central base station, a relay base station, and the terminal, the operation method comprising:

transmitting a request message for requesting a low latency service to the relay base station;

when the low latency service is determined to be supported, receiving, from the relay base station, a response message including information on a common communication scheme commonly used for both of a radio link between the central base station and the relay base station and a radio link between the relay station and the terminal; and receiving downlink data from the relay base station based on the common communication scheme or transmitting uplink data to the relay base station based on the common communication scheme, wherein the radio link between the central base station and the relay base station supports a millimeter wave band, and the radio link between the relay base station and the terminal supports a frequency band other than the millimeter wave band.

9. The operation method according to claim 8, wherein the response message is received when both of a signal quality of the radio link between the central base station and the relay base station and a signal quality of the radio link between the relay base station and the terminal are equal to or greater than a preset threshold.

10. The operation method according to claim 8, wherein, when the low latency service is determined to be supported, a communication scheme used for the radio link between the central base station and the relay base station is configured to be identical to a communication scheme used for the radio link between the relay base station and the terminal.

11. A relay base station in a communication network including a central base station, the relay base station, and a terminal, the relay base station comprising a processor and a memory storing at least one instruction executed by the processor, wherein the at least one instruction is configured to:

receive a request message for requesting a low latency service from the terminal;

in response to the request message, measure a signal quality of a radio link between the central base station and the relay station and a signal quality of a radio link between the relay base station and the terminal;

determine whether to support the low latency service based on the signal qualities;

when the low latency service is determined to be supported, transmit, to the central base station and the terminal, a response message including information on a common communication scheme commonly used for the radio link between the central base station and the relay base station and the radio link between the relay base station and the terminal; and transmit downlink data received from the central base station to the terminal using the common communication scheme without performing modulation and demodulation operations on the downlink data, or transmit uplink data received from the terminal to the central base station using the common communication scheme without performing modulation and demodulation operations on the uplink data.

12. The relay base station according to claim 11, wherein a resource used for the low latency service is configured when the low latency service is determined to be supported, or configured statically in advance.

13. The relay base station according to claim 11, wherein the at least one instruction is further configured to:

perform error checking of the downlink data or the uplink data; and transmit a negative acknowledgement (NACK) message to the central base station and the terminal when there is an error in the uplink data or the downlink data.

14. The relay base station according to claim 11, wherein the radio link between the central base station and the relay base station supports a millimeter wave band, and the radio link between the relay base station and the terminal supports a frequency band other than the millimeter wave band.

15. The relay base station according to claim 11, wherein the at least one instruction is further configured to, when the low latency service is determined not to be supported, transmit a response message indicating that support of the low latency service is impossible to the central base station and the terminal.

16. The relay base station according to 11, wherein the at least one instruction is further configured to, when the low latency service is determined not to be supported, transmit the downlink data to the terminal after performing modulation and demodulation operations on the downlink data, or transmit the uplink data to the central base station after performing.

* * * * *